· US007325150B2

(12) United States Patent
Lehr et al.

(10) Patent No.: US 7,325,150 B2
(45) Date of Patent: *Jan. 29, 2008

(54) COMBINER FOR POWER DELIVERY OVER DATA COMMUNICATION CABLING INFRASTRUCTURE

(75) Inventors: Amir Lehr, Hod Hasharon (IL); Ilan Atias, Haifa (IL)

(73) Assignee: Microsemi Corp.—Analog Mixed Signal Group, Ltd., Hod Hasharon (IL)

( * ) Notice: Subject to any disclaimer, the term of this patent is extended or adjusted under 35 U.S.C. 154(b) by 233 days.

This patent is subject to a terminal disclaimer.

(21) Appl. No.: 11/092,589

(22) Filed: Mar. 29, 2005

(65) Prior Publication Data

US 2005/0169243 A1    Aug. 4, 2005

Related U.S. Application Data

(63) Continuation of application No. 10/657,216, filed on Sep. 9, 2003, now Pat. No. 6,909,943, which is a continuation of application No. 09/293,343, filed on Apr. 16, 1999, now Pat. No. 6,643,566.

(60) Provisional application No. 60/115,628, filed on Jan. 12, 1999.

(51) Int. Cl.
G06F 1/00    (2006.01)
G06F 1/26    (2006.01)

(52) U.S. Cl. .......................... 713/300; 713/320
(58) Field of Classification Search .................. 713/300
See application file for complete search history.

(56) References Cited

U.S. PATENT DOCUMENTS 4,467,314 A    8/1984    Weikel et al.
4,528,667 A    7/1985    Fruhauf
4,692,761 A    9/1987    Robinton (Continued)

FOREIGN PATENT DOCUMENTS

WO    WO96/23377    8/1996

OTHER PUBLICATIONS

Bearfield, J.M., "Control the Power Interface of USB's Voltage Bus", Electronic Design, U.S., Penton Publishing, Clev. Ohio, vol. 45, No. 15, Jul. 1997 p. 80-86.

(Continued)

*Primary Examiner*—James K. Trujillo
*Assistant Examiner*—Stefan Stoynov
(74) *Attorney, Agent, or Firm*—Simon Kahn (57) ABSTRACT

A system for generating, delivering and distributing electrical power to network elements over a data communication network infrastructure within a building, campus or enterprise. Consolidating power distribution and data communications over a single network simplifies and reduces the cost of network element installation and provides a means of supplying uninterrupted or backup power to critical network devices in the event of a power failure. The invention includes power/data combiners that combine a data communication signal with a low frequency power signal. The combined signal is transported over the LAN infrastructure where a power/data splitter extracts the data signal and the power signal and generates two separate outputs. The power over LAN system of the present invention operates with high bandwidth data communication networks, i.e., 10 Mbps, 100 Mbps, 1000 Mbps. The electrical power distributed over the LAN can be delivered as DC or low frequency AC voltages which in either case will not interfere with data communications signals. The electrical power delivered over data communications cable can be transmitted using one or more spare pairs in the cable or over the receive and transmit wires.

20 Claims, 5 Drawing Sheets

U.S. PATENT DOCUMENTS

| | | |
|---|---|---|
| 4,733,389 A | 3/1988 | Puvogel |
| 4,799,211 A | 1/1989 | Felker et al. |
| 4,815,106 A | 3/1989 | Propp et al. |
| 4,885,563 A | 12/1989 | Johnson et al. |
| 4,903,006 A | 2/1990 | Boomgaard |
| 4,992,774 A | 2/1991 | McCullough |
| 5,032,833 A | 7/1991 | Laporte |
| 5,066,939 A | 11/1991 | Mansfield |
| 5,093,828 A | 3/1992 | Braun et al. |
| 5,148,144 A | 9/1992 | Sutterlin et al. |
| 5,192,231 A | 3/1993 | Dolin |
| 5,351,272 A | 9/1994 | Abraham |
| 5,452,344 A | 9/1995 | Larson |
| 5,491,463 A | 2/1996 | Sargeant et al. |
| 5,652,893 A | 7/1997 | Ben Meir et al. |
| 5,684,826 A | 11/1997 | Ratner |
| 5,689,230 A | 11/1997 | Merwin et al. |
| 5,799,196 A | 8/1998 | Flannery |
| 5,828,293 A | 10/1998 | Rickard |
| 5,835,005 A | 11/1998 | Furukawa et al. |
| 5,859,596 A | 1/1999 | McRae |
| 5,884,086 A | 3/1999 | Amoni et al. |
| 5,991,885 A | 11/1999 | Chang et al. |
| 5,994,998 A | 11/1999 | Fisher et al. |
| 6,033,101 A | 3/2000 | Reddick et al. |
| 6,115,468 A | 9/2000 | De Nicolo |
| 6,125,448 A | 9/2000 | Schwan et al. |
| 6,140,911 A | 10/2000 | Fisher et al. |
| 6,218,930 B1 | 4/2001 | Katzenberg et al. |
| 6,243,818 B1 | 6/2001 | Schwan et al. |
| 6,301,527 B1 | 10/2001 | Butland |
| 6,329,906 B1 | 12/2001 | Fisher et al. |
| 6,348,874 B1 | 2/2002 | Cole et al. |
| 6,377,874 B1 | 4/2002 | Ykema |
| 6,393,607 B1 | 5/2002 | Hughes et al. |
| 6,480,510 B1 | 11/2002 | Binder |
| 6,496,105 B2 | 12/2002 | Fisher et al. |
| 6,753,761 B2 | 6/2004 | Fisher et al. |
| 2003/0058085 A1 | 3/2003 | Fisher et al. |

OTHER PUBLICATIONS

RAD Data Comm. Ltd., "Token Ring Design Guide", 1994, #TR-20-01/94, Chapters 1 through 4-21.
PowerDsine Product Catalogue 1999, pp. 56-79 and 95-105, Israel.
ITU-T 1.430 Integrated Services Digital Network—Basic User-Network Interface—Layer 1 Specification.
Universal Serial Bus Specification—Rev 1.0, Jan. 16, 1996; Sec 4.2.1 pp. 29-30.
Universal Serial Bus Specification—Rev 1.0, Jan. 16, 1996; Sec 7.2.1-7.2.1.5 pp. 131-135.
Universal Serial Bus Specification—Rev 1.0, Jan. 16, 1996; Sec 9.2.1-9.2.5.1 pp. 170-171.
Universal Serial Bus Specification—Rev 1.0, Jan. 16, 1996; Sec 9.6.2 pp. 184-185.
Lynn K "Universal Serial Bus (USB) Power Management"; WESCON/97 Conference Proceedings, Santa Clara, CA, USA, Nov. 4-6, 1997; New York, N.Y.; IEEE Nov. 4, 1997 pp. 434-441 XP010254418.

COMBINER FOR POWER DELIVERY OVER DATA COMMUNICATION CABLING INFRASTRUCTURE

REFERENCE TO RELATED APPLICATIONS

This application is a continuation of U.S. patent application Ser. No. 10/657,216 filed Sep. 9, 2003, now U.S. Pat. No. 6,909,943, which is a continuation of U.S. patent application Ser. No. 09/293,343 filed Apr. 16, 1999 that issued as U.S. Pat. No. 6,643,566 Nov. 4, 2003, and which claims priority from U.S. Provisional Application Ser. No. 60/115,628 filed Jan. 12, 1999.

FIELD OF THE INVENTION

The present invention relates generally to power generation and delivery and more particularly relates to a system for generating power and delivering it over the data communication cabling infrastructure within a facility.

BACKGROUND OF THE INVENTION

Currently, the infrastructure making up Ethernet Local Area Networks (LANs) and Wide Area Networks (WANs) is constructed to carry and distribute high bit rate data communication signals between network devices. The network devices or elements, may include, for example, hubs, switches, bridges, routers, interconnection equipment, various devices that are equipped with Network Interface Cards (NICs), data servers, desktop PCs, portable PCs and other various network equipment. What all these devices have in common, among other things, is that they all require electrical power in order to operate. In each case, the electrical power consumed by these devices is supplied by internal or external batteries or by AC power supplied from a power utility.

Today, every network element device that is not self energized, i.e., includes an internal or external battery, requires a connection to a source of electrical power in addition to one or more network connections. The requirement of network devices to connect to a source of electrical power complicates installation and makes it more costly. In addition, it limits the location of network elements to locations where electrical power connections and data network connections are available. Ultimately, two separate networks must be built and maintained, wherein each network is connected to the network device. One network supplies electrical power distribution and the other network supplies connectivity to the data communications network.

Further, for network devices to operate during partial or complete electrical power supply interruption or failure, each network device must either incorporate an internal battery backup system or must be connected to an Uninterruptable Power Supply (UPS). Depending on the application, such as with IP or LAN telephones, the number of network devices that must operate during building power failures may be very high.

Thus, it would be desirable to eliminate the need for each network device that does not operate from a battery to be connected to a source of AC utility power, i.e., a standard AC electrical receptacle, in addition to a network connection. This would significantly reduce the number of electrical cables, AC receptacles and associated connections thereby simplifying the installation of network devices. In addition, this would also provide a cost effective means for providing an uninterruptable power source to multiple network devices.

It is important to point out that the data communications network infrastructure was primarily designed and optimized to carry high bandwidth low power data communications signals and was not designed to deliver electrical power. The IEEE 802.3 standard requires that the electrical voltages carried over the transmitting cable be isolated and balanced in reference to earth ground at both ends. Category 3 to 5 LAN cables, RJ-45 connectors, the line interface of network devices and all IEEE 802.3 compatible devices within the network were not designed to carry electrical power at a sufficient level to operate the majority of network devices.

Therefore, any solution that uses the LAN infrastructure to simultaneously distribute electrical power and provide network data communications should address the following points: (1) electrical power distribution over the LAN infrastructure should neither increase the network bit error rate (BER) beyond permissible levels nor disturb normal data communications in any way; (2) electrical power on the LAN infrastructure should not introduce any possibility of harm or risk to users and network maintenance personnel; (3) electrical power over the LAN infrastructure should not harm or cause damage to standard LAN equipment which is not designed to receive power from the data communications network; and (4) the addition of electrical power over the data communications network should not degrade the reliability of the network.

Systems for delivering data communication signals over power networks are known in the art. Power line carrier systems are well known and function to superimpose relatively high frequency data signals over low frequency power cabling. These systems, however, are designed to operate over power lines that are very different from the LAN. The LAN medium is designed and constructed to carry data communication signals. Thus, the cables, connectors, line interface circuitry and terminal devices are not designed to handle high levels of electrical power. This is very different from superimposing low energy level data communication signals over power line networks.

Figure 1:
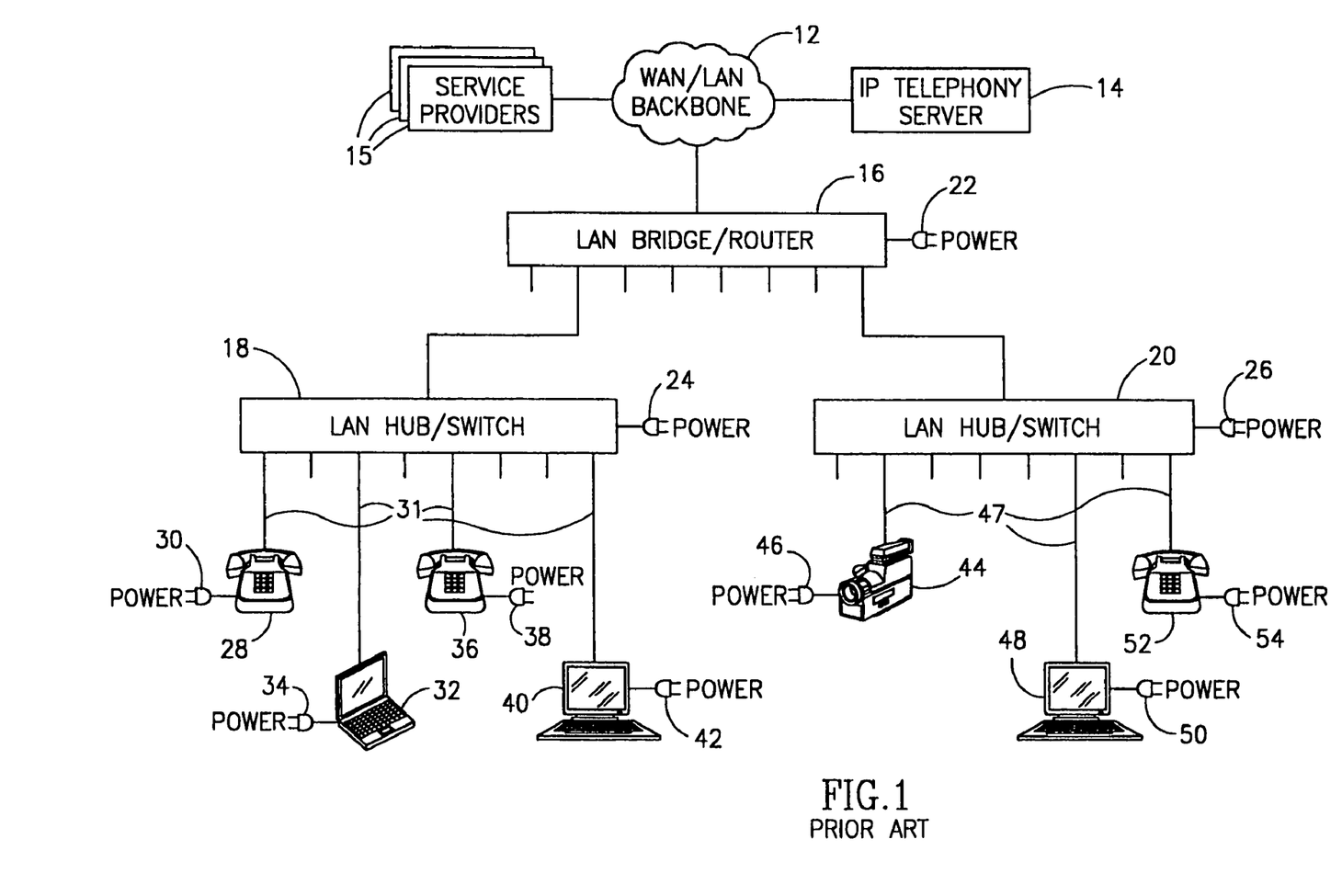
FIG. 1 is a block diagram illustrating an example prior art data communications network wherein network devices are coupled to the AC main utility power.

A block diagram illustrating an example prior art data communications network wherein network devices are coupled to the AC main utility power is shown in FIG. 1. This example network is presented to illustrate the various network elements that are typically found in a LAN environment. The network, generally referenced 10, comprises a combination WAN and/or LAN backbone 12 coupled to an IP telephony server 14 and/or to one or more other service providers 15 and also to a LAN bridge/router 16 which is connected to a source of AC power via electrical plug 22. The IP telephony server 14 functions to provide telephone service for a plurality of Internet or IP telephones 52, 36, 28.

The LAN bridge/router 16 is coupled to two LAN hubs or switches 18, 20. IP telephones 28, 36, laptop or other portable computer 32 and desktop computer 40 are coupled to LAN hub/switch 18 via network data connections 31. LAN hub/switch 18 is connected to a separate source of AC power via electrical plug 24. IP telephone 28, 36, portable computer 32 and desktop computer 40 are connected to a source of AC power via electrical plugs 30, 38, 34, 42, respectively.

The LAN hub/switch 20 is also coupled to a separate source of AC power via electrical plug 26. A video camera 44 (e.g., standard video camera or Web camera), portable computer 48 and IP telephone 52 are coupled to LAN hub/switch 20 via network data only connections 47. Video camera 44, portable computer 48 and IP telephone 52 are connected to a source of AC power via electrical plugs 46, 50, 54, respectively.

It is noted that each network device requires a separate data communications connection and a connection to a source of electrical power. The data networking connection is made in the normal manner using standard LAN cabling to conventional hubs, switches, routers, etc. Electrical power to each network device is supplied via a plurality of AC mains receptacles. Thus, each network device must be provided with at least two utility hook ups: one to the data communications network and the second to the AC electrical power network.

SUMMARY OF THE INVENTION

The present invention is a system for generating, delivering and distributing electrical power to network elements over a data communication network infrastructure within a building, campus or enterprise. Consolidating power distribution and data communications over a single network serves to (1) both simplify and reduce the cost of network element installation and (2) provide a means of supplying uninterrupted or backup power to critical network devices in the event of a power failure.

Network installations that utilize the present invention can be simplified and are less costly because the number of required power cables, power receptacles and AC power supplies or adapters is greatly reduced. In addition, network devices, terminals and other networking equipment can be placed without regard to the existence of or the location of AC receptacles.

The system of the present invention also provides for a significant cost reduction in providing uninterruptable backup electrical power to critical network devices and terminals in the event of a power supply failure or interruption. This is due to the fact that distributing backup power, i.e., power from an uninterruptable power supply, from a few points in the network via the LAN infrastructure is far more efficient than connecting each critical network element to its own dedicated UPS or to a backed up power line. An assumption that is valid most of the time is that only a relatively small portion of the network elements, e.g., hubs, switches, routers, etc., need to be connected to a dedicated source of uninterruptable power while the remainder of the critical network devices receive their operating power via the LAN infrastructure.

Another benefit of the system of the present invention is that the safety requirements and cost of network terminal equipment can be reduced since electrical power can now be fed from low voltages delivered over the LAN infrastructure. This is in contrast to the current method of providing an internal or external 110/220 VAC power supply that requires that the network device receive certification by one or more testing organizations such as Underwriters Laboratory (UL). In the case of IP telephony, which is becoming more and more popular, providing power over the LAN permits the IP telephone to have a source of uninterruptable power just as ordinary analog based telephones connected to the PSTN enjoy today.

The disclosure presented hereinbelow describes an apparatus for and methods for generating, delivering and managing electrical power over LAN network infrastructures that are primarily designed for digital communications purposes. The invention functions to reduce any possible disturbances to the data communications and to maintain compatibility with the IEEE 802.3 and other relevant standards.

The power over LAN system of the present invention operates with high bandwidth data communication networks, i.e., 10 Mbps, 100 Mbps, 1000 Mbps, which are naturally more susceptible to noise, network bandwidth, near end and alien crosstalk. In addition, the present invention takes into account the limitation in cable length imposed by modern LANs, i.e., hundreds of meters versus kilometers in PSTN, ISDN and HDSL communication lines. The invention discloses novel remote power feeding methods that are better suited for shorter haul cable runs.

Further, the electrical power distributed over the LAN can be delivered as DC or low frequency AC voltages which in either case will interfere minimally with data communications signals. The electrical power delivered over the data communications cable can be transmitted using one or more spare pairs in the cable. Ethernet communications requires 2 pairs (4 conductors) to implement. If 4 pair (8 conductor) Category 3, 4 or 5 cable is used, than 2 pairs are not used for data communications. The electrical power can be transmitted using one or more of the cable wire pairs. Alternatively, if the data cable comprises only two pair, then the electrical power is distributed using one or two of the available pairs, i.e., the receive and transmit wires. Thus, in accordance with the invention, power can be delivered over any combination of used and/or unused twisted pair wires in the data communication cable.

There is provided in accordance with the present invention a system for distributing electrical power over a data communication cabling infrastructure to one or more electrical power consuming network devices comprising a data communications cabling network, a source of electrical power, at least one power/data combiner coupled to the source of electrical power and to the data communications cabling network, the at least one power/data combiner operative to generate and inject a low frequency power signal onto a data communications signal received from the data communications cabling network so as to yield a combined power/data signal which is subsequently output onto the data communications cabling network and at least one power/data splitter adapted to receive the combined power/data signal and to extract and separate therefrom the original data communication signal and the low frequency power signal.

The data communications network may comprise an Ethernet based Local Area Network (LAN). The power/data combiner can be implemented as a standalone unit, integrated into a Local Area Network (LAN) hub or into a Local Area Network (LAN) switch.

The power/data combiner may comprise a plurality of data only input ports and a plurality of data plus power output ports, each data in port and data plus power output port forming a separate channel. In addition, the power/data combiner is adapted to receive electrical from an AC mains power receptacle, an uninterruptable Power Supply (UPS) or an another power/data combiner.

The power/data combiner comprises means for filtering high frequency noise and ripple, for sensing the current in the low frequency power signal, for connecting and disconnecting the low frequency power signal to and from the combined output power/data signal and for detecting no-load and overload conditions on the combined output power/data signal.

The system further comprises a management unit for monitoring and provisioning, via the data communications cabling network, the power/data combiners and power/data splitters located in the data communications cabling network.

The power/data splitter can be implemented as a standalone unit or integrated into a network device. The power/data combiner may comprise an AC/DC or DC/DC power converter for converting the extracted low frequency power signal into one or more output voltages.

There is also provided in accordance with the present invention a method for distributing electrical power over a data communication cabling infrastructure to one or more electrical power consuming network devices, the method comprising the steps of generating a low frequency power signal from a source of electrical power, injecting the low frequency power signal into a data communications signal being carried over the data communications cabling network so as to generate a combined power/data signal, transmitting the combined power/data signal onto the data communications cabling network, receiving the combined power/data signal carried over the data communication cabling network and splitting the combined power/data signal so as to yield the data communication signal separated from the low frequency power signal.

There is further provided in accordance with the present invention a system for distributing electrical power over a data communication cabling infrastructure to one or more electrical power consuming network devices comprising a data communications cabling network, a source of electrical power, power supply means for generating a low frequency power signal from the source of electrical power, combiner means coupled to the data communications cabling network, the combiner means for injecting the low frequency power signal onto a data communications signal being carried over the data communications cabling network so as to yield a combined power/data signal, regulator means for regulating the injection of the low frequency power signal onto the data communications signal, the regulation including, but not limited to, ceasing the injection of the low frequency power signal and limiting its current, extraction means for extracting the low frequency power signal from the combined power/data signal and for outputting the original data communication signal and the low frequency power signal.

BRIEF DESCRIPTION OF THE DRAWINGS

The invention is herein described, by way of example only, with reference to the accompanying drawings, wherein.

The invention is herein described, by way of example only, with reference to the accompanying drawings, wherein.

DETAILED DESCRIPTION OF THE INVENTION

Notation Used Throughout

The following notation is used throughout this document.

| Term | Definition |
|------|------------|
| AC | Alternating Current |
| BER | Bit Error Rate |
| DC | Direct Current |
| HDSL | High bit rate Digital Subscriber Loop |
| IP | Internet Protocol |
| ISDN | Integrated Service Digital Network |
| LAN | Local Area Network |
| NIC | Network Interface Card |
| PC | Personal Computer |
| PSTN | Public Switched Telephone Network |
| UL | Underwriters Laboratory |
| UPS | Uninterruptable Power Supply |
| WAN | Wide Area Network |

General Description

The present invention is a system for generating, delivering and distributing electrical power to network elements over a data communication network infrastructure within a building, campus or enterprise. Consolidating power distribution and data communications over a single network serves to simplify and reduce the cost of network element installation and to provide a means of supplying uninterrupted or backup electrical power to critical network devices in the event of a power failure.

The disclosure presented hereinbelow describes an apparatus for and methods for generating, delivering and managing electrical power over LAN network infrastructure that is primarily designed for digital communications purposes. The invention functions to reduce any possible disturbances to the data communications and to maintain compatibility with the IEEE 802.3 and other relevant standards.

Figure 2A:
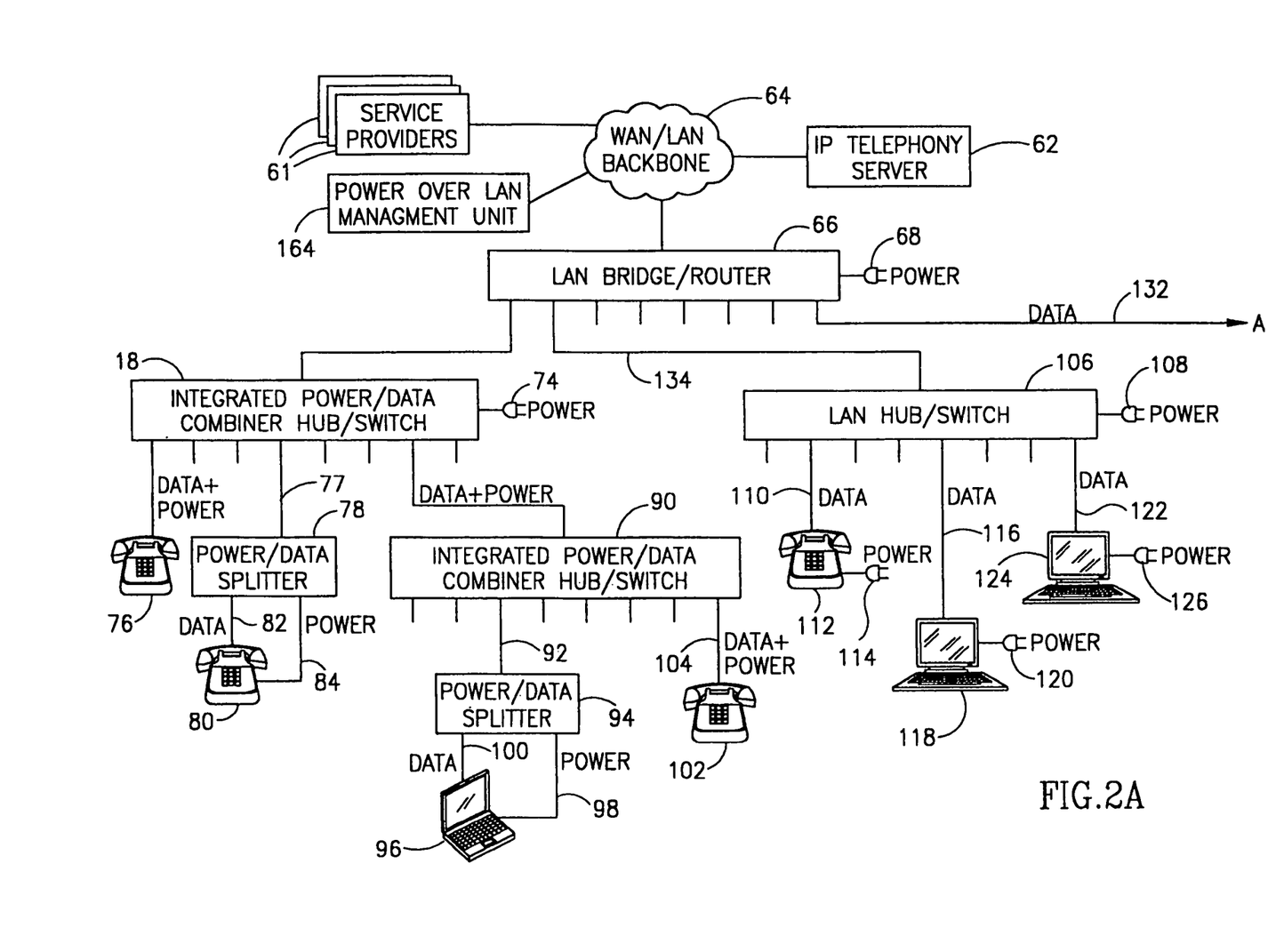
FIGS. 2A and 2B are a block diagram illustrating an example data communications system constructed in accordance with the present invention wherein network devices receive electrical and network connectivity over the same cable.
Figure 2B:
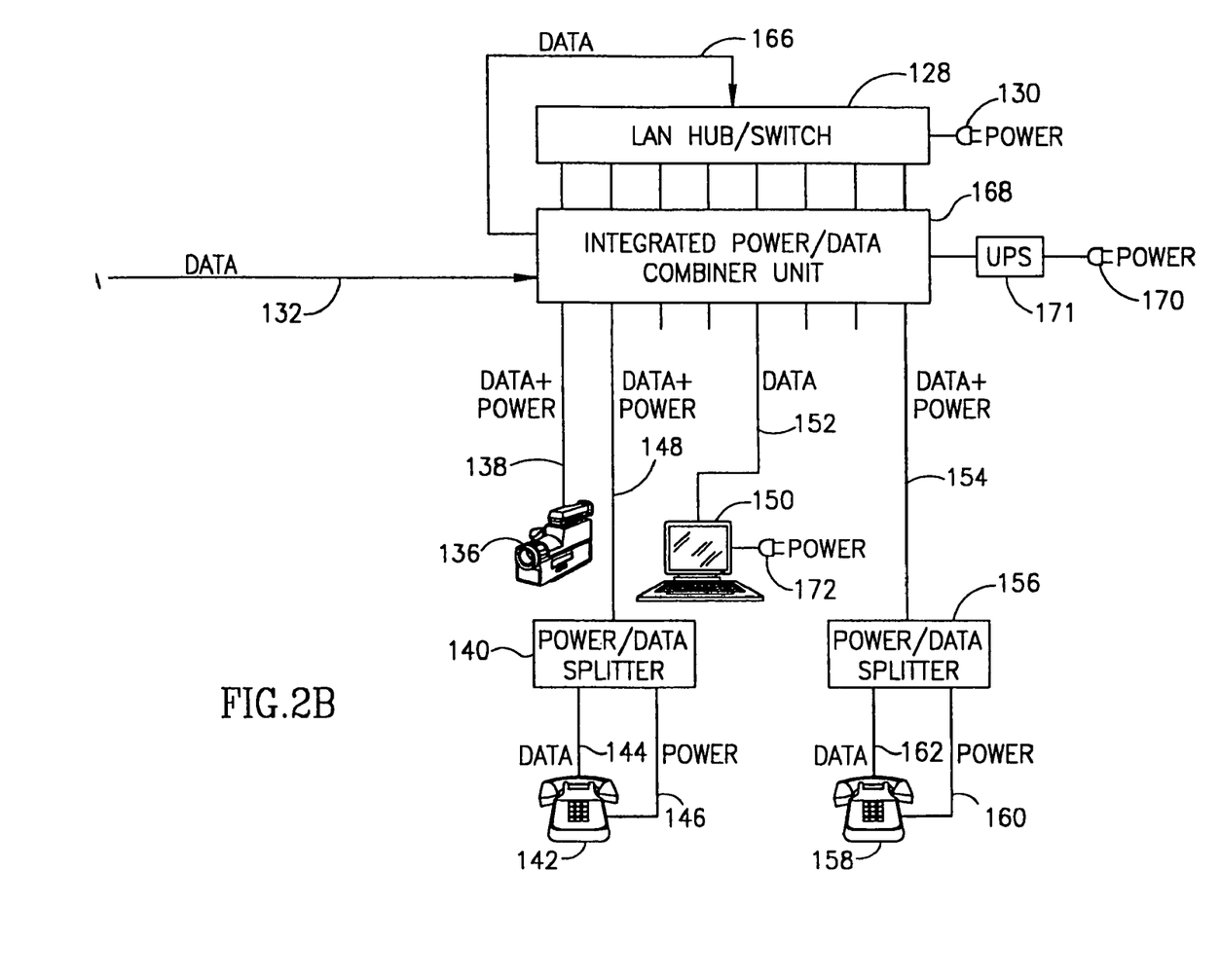

A block diagram illustrating an example data communications system constructed in accordance with the present invention wherein network devices receive electrical and network connectivity over the same cable is shown in FIGS. 2A and 2B. The network, generally referenced 60, comprises a WAN and/or LAN backbone 64 that is coupled to an IP telephone server 62, other service providers 61, a power over LAN management unit 164 and a LAN bridge/router 66. The IP telephony server 62 serves to provide telephone service to the plurality of IP telephones connected to the network 60. The power over LAN management unit 164, described in more detail hereinbelow, provides administrative and power management functions for all the power over LAN enabled devices in the network.

Electrical power may be combined with the data communication signals in a device termed a power/data combiner. The combined power/data signal is transmitted over standard LAN cabling, e.g., Category 3, 4, 5 LAN cabling, which meets EIA/TIA 568A or similar premises cabling standard, a network device that functions to split or separate the data from the power. The data signal is input to the network port on the device and the electrical power is input to the power input connector on the device.

In one embodiment, the power/data combiner circuitry is implemented as a standalone external power/data combiner unit 168. Alternatively, it is implemented together with a network element such as a hub or switch and referred to as an integrated power/data combiner hub/switch 72, 90.

Similarly, in one embodiment, the power/data splitter is implemented as a standalone external power/data splitter unit 156. Alternatively, it is integrated into a network device such as IP telephone 102.

Whether or not the power/data combiner and power/data splitter are implemented as an external standalone unit or integrated into a network device, their functionality is similar. The power/data combiner functions to superimpose a low frequency power signal onto the high frequency, low power data communications signal. The low frequency power signal may have a frequency, for example, from DC up to conventional power utility frequencies, i.e., 50 or 60 Hz. The power/data splitter functions to separate the low frequency power signal from the high frequency, low power data communication signal.

Various alternative embodiments of the power over LAN system of the present invention are shown in FIGS. 2A and 2B. Not all the network elements are power over LAN enabled. Not all the devices must be power over LAN enabled. Conventional non power over LAN network devices can exist in the same network. The power over LAN enabled devices operate transparently from non enabled devices.

Typical applications of network systems/elements that the power over LAN system of the present invention can be applied to include, but are not limited to, in general, any system or element that is connected to a LAN, and more specifically, IP or LAN telephony, digital video cameras, Web cameras, video conferencing equipment, wireless LAN products incorporating transmitters and receivers, portable computers, workstations and network printers. Also included are security system devices such as alarms and sensors that are connected to the network, remotely controlled Smart Home devices such as LonWorks or CEBus compatible products and all types of traditional data networking equipment such as hubs, switches, routers, bridges. Each of the above listed devices can be adapted to receive their operating electrical power from the LAN infrastructure. The number and type of devices that can be adapted to receive power over the LAN is limited, however, to the amount of power the LAN cabling is able to carry in terms of safety and cost.

The power over LAN system comprises systems and subsystems that can be integrated together at any network level, i.e., from the network element/device level through the network hub and backbone switch level. The power over LAN system can be added onto a conventional LAN installation or can be integrated into the network elements themselves, e.g., hubs, switches, routers, bridges, switches, etc.

Some of the devices receive electrical power from the AC main receptacles and some receive power over the LAN cabling infrastructure. The LAN bridge/router 66 receives AC main power via electrical plug 68. Likewise integrated power/data combiner hub/switch 72 and conventional LAN hub/switch 106, 128, receive AC main power via electrical plugs 74, 108, 130, respectively. External power/data combiner unit 168 receives power from UPS171 which, in turn, is connected to AC main power via electrical plug 170. Integrated power/data combiner hub/switch 90 receives power over the LAN cabling via cable 88.

Integrated power/data combiner hub/switch 72 is connected to the LAN bridge/router 66 via a cable 70 that carries only data. Network devices connected to the hub/switch 72 include IP telephones 76, 80. IP telephone 76 is connected by a combined power/data cable 86 and integrates a power/data splitter within the phone. IP telephone 80 is connected to an external power/data splitter 78 via separate data cable 82 and power cable 84. The power/data splitter 78 is connected to the hub/switch 72 via a cable 77 that carries both power and data.

Devices coupled to the integrated power/data combiner hub/switch 90 include portable computer 96 and IP telephone 102. The portable computer 96 is connected to an external power/data splitter 94 via a cable 100 that carries only data and a power cable 98. The power/data splitter 94 is connected to the hub/switch 90 via a cable 92 that carries both power and data. IP telephone 102 is connected by a cable 104 that carries both power and data and integrates a power/data splitter within the phone. Note that the hub/switch 90 comprises an internal power/data splitter to separate the combined data communications signal and electrical power signal received from hub/switch 72.

Conventional LAN hub/switch 106 is connected to the bridge/router 66 and to AC power via electrical plug 108. Network devices connected to the hub/switch 106 include IP telephone 112 and desktop computers 118, 124. The IP telephone is connected to the hub/switch 106 via a cable 110 that carries only data and to AC power via electrical plug 114. Desktop computers 118, 124 are connected to the hub/switch 106 via data only cables 116, 122, respectively, and to AC power via electrical plugs 120, 126, respectively.

A data communications only cable 132 connects the bridge/router 66 to the external power/data combiner unit 168. A data communications only cable 166 connects the power/data combiner unit 168 to a conventional LAN hub/switch 128 that is connected to AC power via electrical plug 130. The power/data combiner unit 168 is connected to a plurality of network devices comprising a network ready video camera 136, IP telephone 142, 158 and desktop computer 150. Each network device connected to the power/data combiner unit 168 has a corresponding data communications only connection from the power/data combiner unit 168 to the hub/switch 128. Under normal operating conditions, the communications signals received over data cable 132 are passed through, i.e., bridged, transparently to data cable 166. In the event of a power failure, however, the conventional LAN hub/switch 128 is bypassed and the data communication signals are routed directly to the network devices connected to the power/data combiner unit 168.

The network ready video camera 136 is connected to the power/data combiner 168 via a cable 138 that carries both data and power. IP telephone 142 is connected to an external power/data splitter 140 via separate data cable 144 and power cable 146. The power/data splitter 140 is connected to the power/data combiner unit 168 via a combined power/data cable 148. Similarly, IP telephone 158 is connected to an external power/data splitter 156 via separate data cable 162 and power cable 160. The power/data splitter 156 is connected to the power/data combiner unit 168 via a combined power/data cable 154. Desktop computer 150 is connected to the power/data combiner unit 168 via a data communications only cable 152 and to AC power via electrical plug 172.

As described above, the network 60 can be adapted to provide backup electrical power in the event of a power failure. One or more UPS units can be placed strategically in the network 60 to provide power to critical network devices that must be powered even in the event of a power failure. Examples include IP telephones, networked security devices, wireless LAN devices incorporating transmitters and receivers, etc. In the example network shown in FIGS.

2A and 2B, the UPS unit 171 is connected to AC power via electrical plug 170 and provides power to external power/data combiner unit 168. Alternatively, additional UPS units can be placed in the network and/or UPS 171 can be adapted to supply electrical power to more than one power/data combiner device.

It is important to note that distributing backup electrical power, i.e., power from an uninterruptable power source, from a few points in the network via the LAN infrastructure is more cost effective than connecting each critical network element to its own dedicated UPS or alternatively creating a UPS power distribution cabling system throughout the organization in addition to the ordinary power network. In the event of a power failure, electrical power is supplied from the UPS to those critical network elements that require it. Which power over LAN enabled network devices are to receive power in the event of a failure can be configured into the power/data combiner unit beforehand. Configuration can be performed locally via a management port or remotely via the management unit 164 connected to the LAN/WAN backbone 64.

It is important to note that a benefit of the system of the present invention is that the safety requirements and cost of network terminal equipment can be reduced since electrical power is distributed as low voltages over the LAN infrastructure. In the case of IP telephony providing power over the LAN permits the IP telephone to have a source of uninterruptable power just as ordinary analog based telephones connected to the PSTN enjoy today.

The electrical power distributed over the LAN can be delivered either as DC or low frequency AC voltages. In either case, the delivery of power over the LAN infrastructure does not interfere with data communications signals. The power voltages over the LAN cabling are kept below 120 V peak and the current is limited in order to maintain compatibility with safety standards such as UL 60950 and EN 60950.

Note also that the electrical power delivered over LAN cabling can be transmitted using one or more spare pairs in the cable. Ethernet communications requires 2 pairs (4 conductors) to implement. If the cabling plant is EIA/TIA 568A compatible and includes 4 pairs, than 2 pairs remain unused. The electrical power can be transmitted using one or two of the unused pairs. In this case the power splitter and combiner are not necessarily needed and direct injection and extraction of power can be implemented. Alternatively, if the data cable comprises only two pair, then the electrical power is distributed using one or two of the available pairs, i.e., the receive and transmit wires.

Power/Data Combiner Unit

Figure 3:
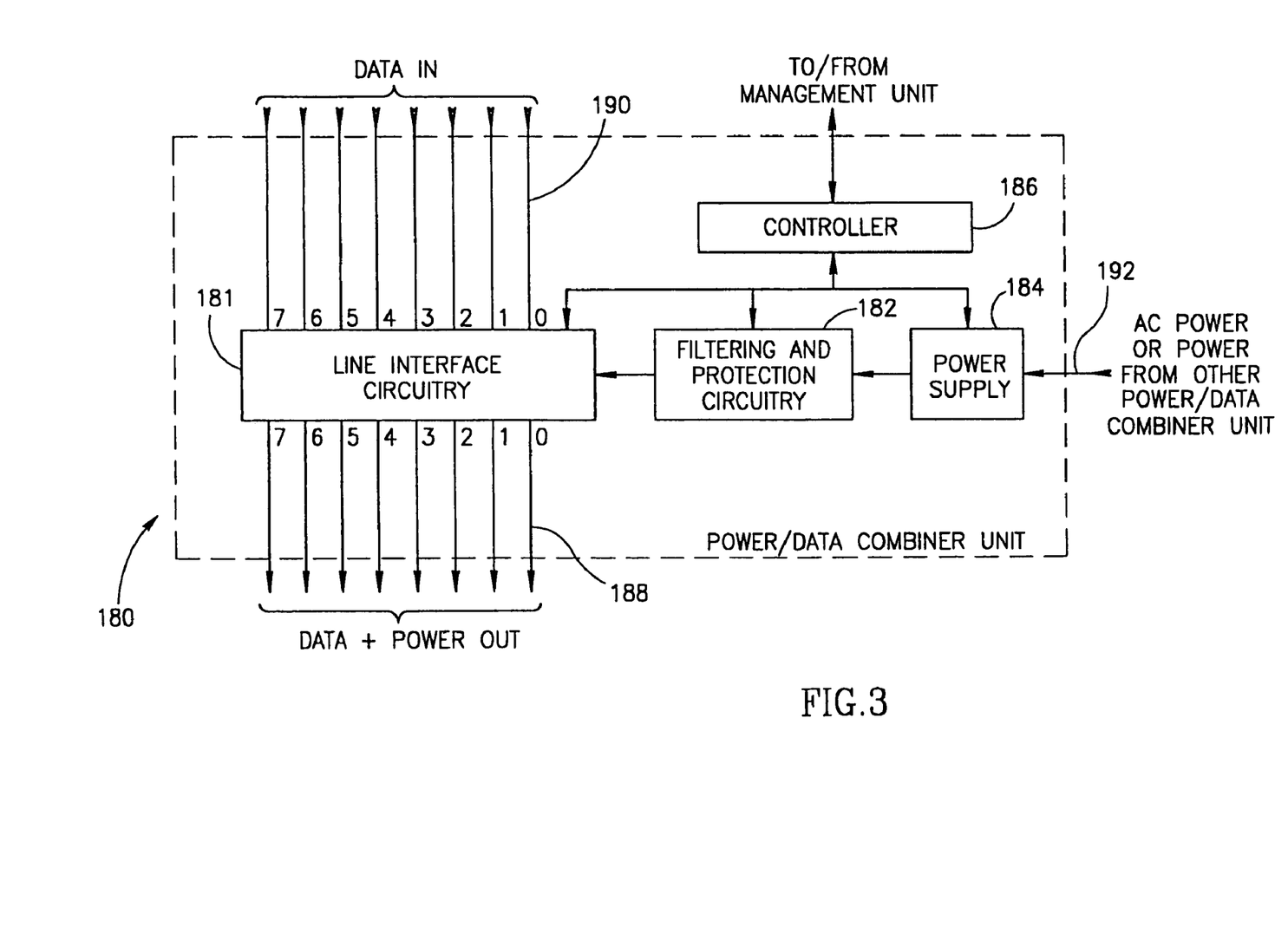
FIG. 3 is a block diagram illustrating a power/data combiner unit for placing electrical power onto the data communications infrastructure.

A block diagram illustrating a power/data combiner unit for placing electrical power onto the data communications infrastructure is shown in FIG. 3. As described previously, the power/data combiner functions, whether implemented as an external standalone unit or integrated with a network element, functions to combine an electrical power signal and a data communications signal to form a combined power/data signal. The description that follows uses the external power/data combiner as an illustrative example. Note, however, that the description applies as well to the integrated embodiment.

The power/data combiner, generally referenced 180, comprises line interface circuitry 181, filtering and protection circuitry 182, a power supply 184 and a controller 186. The line interface circuitry 181 comprises a plurality of input ports 190 and output ports 188 and provided voltage isolation between all inputs and outputs. The input ports 190 receive data only signals from a hub or switch. The output ports 188 output a combined data plus power signal to connected power over LAN enabled devices, e.g., power/data splitters or integrated network elements.

The power/data combiner unit 180 is connected to a conventional LAN 10/100/1000 Base T hub or switch via the data in ports 190. Note that although eight data in ports are shown, the power/data combiner can comprise any number of data in ports, e.g., 16, 24, 32. The conventional hub or switch and power/data combiner 180 may or may not have the same number of ports, but preferably they are the same. The power/data combiner unit 180 functions to inject the DC or AC power to each LAN channel.

The power/data combiner unit 180 is adapted to accept electrical power from ordinary building AC power, an UPS or from another power over LAN enabled device and to distribute it to one or more network device connected thereto. Each output channel may comprise an Ethernet channel that carries data communications signals only, power signals only or both data communications and power signals simultaneously. The power/data combiner unit comprises circuitry that minimizes any disturbances to data communications.

The power supply 184 is connected to a source of AC electrical power via connector or cable 192. Alternatively, the power can be received from another power/data combiner unit. The power supply 184 functions to provide the energy needed for the operation of the power/data combiner unit 180 itself and the total energy needed by the remotely powered network devices connected downstream of the unit 180. The power supply 184 is preferably constructed to support the worst case energy, i.e., maximum, required by a channel multiplied by the number of channels. Alternatively, the power supply 184 is constructed to support a lesser amount of power assuming there exists an a priori prediction of power consumption by all channels.

The filter and protection circuit 182 functions to permit the high frequency data communications signal to pass uninterrupted and transparently from input to output. The circuit 182 prevents the low impedance output of the power supply from attenuating the data communications signal and prevents communications signals on one channel from leaking into another channel via the common power supply unit 184, i.e., prevents crosstalk. The circuit also functions to filter the high frequency ripple and noise produced by switching power supplies and to provide a high output impedance from the power supply for high frequencies.

Further functions of the filter and protection circuit 182 comprise limiting the power available to each channel in accordance with a predetermined level, current sensing for each wire pair, minimum and maximum current threshold reference levels, unbalanced or current leakage detection and the capability of connecting and disconnecting power to/from each channel. The minimum and maximum current threshold reference levels may be fixed or controlled via a management unit depending on the implementation and configuration of the system. An important function of the circuit 182 is that it will disconnect a shorted or otherwise faulty port such that other operational channels are not effected.

The controller 186, suitably programmed, functions to administer and control the operation of the components within the power/data combiner 180 and to provide telemetry functions to an external management entity. The controller functions to communicate with a management unit connected either locally or remotely via the network. The controller permits online modification of the power being distributed to each channel. Other functions include status reporting such as reporting on the power consumed by each channel, any channel failures and any failures within the power/data combiner unit itself.

In the integrated embodiment, the power/data combiner unit functionality is integrated into a conventional LAN connectivity hub or switch, e.g., 10, 100 or 1000 BaseT. The internal power supply of the hub is modified to support the increased load of the normal hub operation and the remote power feeding functions. A line interface circuit is inserted between the output port and the internal networking circuitry of the hub. In addition, the filtering and protection circuitry is added to couple the line interface circuitry to the power supply. Each of the standard LAN ports is replaced with a combined data plus power port. This integrated embodiment serves to reduce overall system cost, reduce the space required and reduces the complexity of the network. It does require, however, modification of a conventional hub or switch.

In either the external or integrated embodiments, the data being received by the power/data combiner is bidirectional transferred from each channel input to its corresponding channel output. The power is injected into each channel output port. The amount of output power allotted to each output channel can be set independently. In addition, each output channel is self protected against short circuit and overload conditions.

Further, in connection with the external power/data combiner embodiment, two additional LAN ports can optionally be provided. An input LAN port and an output LAN port can be provided whereby during normal operation, the two ports are bridged together. The conventional hub or switch is fed via the output LAN output port. The input LAN port is connected to the upstream network device, e.g., hub or switch. In the event of a power failure, the power/data combiner unit disconnects the input and output LAN ports and directs the data communications from the input LAN port directly to one or more output channels. Thus, both data and power continuity are provided in the event the upstream data hub or switch is not operational.

Power/Data Splitter Unit

Figure 4:
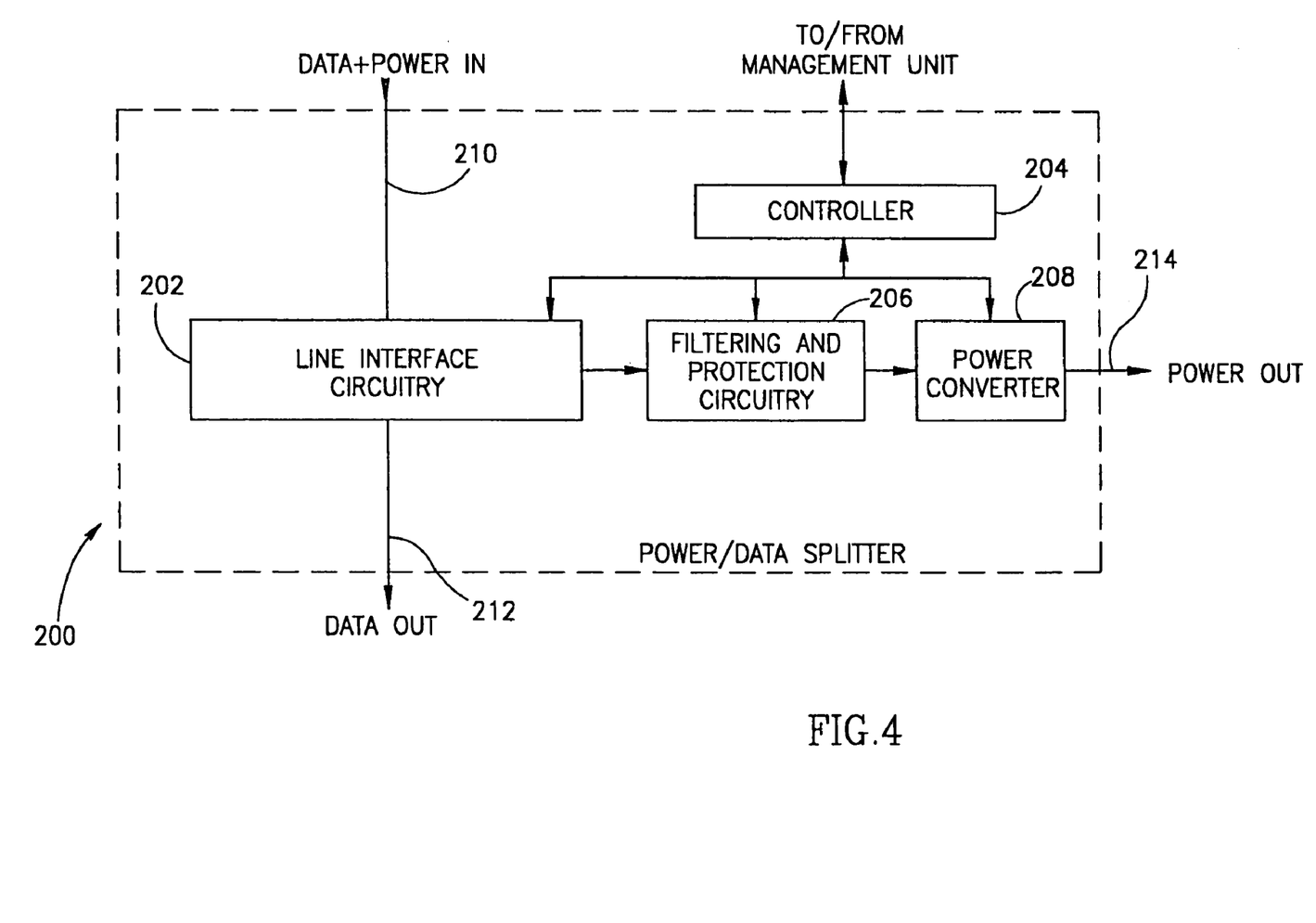
FIG. 4 is a block diagram illustrating a power/data splitter unit for separating electrical power form the data communications infrastructure.

A block diagram illustrating a power/data splitter unit for separating electrical power form the data communications infrastructure is shown in FIG. 4. As described previously, the power/data splitter functions to accept a LAN channel at its input that carries both power and data simultaneously over the same cable wires and to separate the two signals into a power signal and a data signal. Both these signals are then forwarded to the attached network device. The two output signals can comprise two separate cable connections, i.e., one for data and one for power. The data cable connection behaves as a standard LAN data channel dedicated for data communications. The power cable connection serves to drive the power loads with power extracted from the combined input. The power/data splitter functions to isolate the input voltage from the output voltage. In addition, an AC/DC or DC/DC voltage converter can be used to convert the input voltage to one or more voltage levels to meet the specific requirements of the attached network device.

The power/data splitter, generally referenced 200, comprises line interface circuitry 202, filtering and protection circuitry 206, a power converter 208 and a controller 204. The splitter 200 is normally connected between the LAN wall outlet receptacle, for example, and the network device. Functionally, the power/data splitter 200 blocks high frequency signals from passing through to the power output by presenting a high impedance to high frequencies, allows low frequency and DC power signals to pass through and blocks conduction of high frequency noise from the power converter input to the data channel.

The line interface circuitry 202 comprises a data plus power input port 210 and a data communications only output port 212. The extracted power is output via power output port 214. The line interface circuitry 202 receives the signal from a LAN channel and provides high pass filtering to permit undisturbed bidirectional transport of the data communication signal form the data plus power input port 210 to the data only output port 212.

The filtering and protection circuitry 206 provides low pass filtering between the data plus power input port 210 to the input of the power converter 208. The power converter 208 accepts the voltage extracted from the LAN channel and functions to convert it to one or more output voltages. The power converter 208 may comprise an AC/DC or a DC/DC voltage converter depending on the voltage extracted from the LAN channel. The power converter can be adapted to generate any number of voltages in accordance with the specific requirements of the network device attached to the power/data splitter 200.

The controller 204, suitably programmed, functions to administer and control the operation of the components within the power/data splitter 200 and to provide telemetry functions to an external management entity. The controller functions to communicate with a management unit connected either locally or remotely via the network. Other optional functions include status reporting such as reporting on the power consumed by each channel, any channel failures and any failures within the power/data splitter itself.

In the integrated embodiment, the power/data splitter functionality is integrated into a conventional network device, e.g., IP or LAN telephone, portable or desktop computer. The network device is modified to receive the combined power/data signal. The standard LAN port and power port are replaced with a combined data plus power port. A line interface circuit is inserted between the input port and the internal network data and power in port. In addition, the filtering and protection circuitry is added to couple the line interface circuitry to the power supply. This integrated embodiment serves to reduce overall system cost, reduce the space required and reduces the complexity of the network. It requires, however, modification of a conventional network device.

Power Over LAN Management Unit

It would be inefficient in terms of complexity and cost to construct a power delivery and distribution network assuming that each network port and node simultaneously consumes the maximum allocated output power. In addition, such a power network would likely create power 'bottlenecks' over the data network and would force the use of special cabling that is non standard for common LAN installations. Further, the equipment used to implement such a power network would most likely exceed the thermal and power specifications of standard networking equipment cabinets which are designed to hold stackable hubs, switches, routers and various types of network management units, resulting in a failure to accommodate such equipment.

Therefore, the power over LAN system of the present invention may utilize in the construction of the power network, the statistical patterns that indicate the expected power consumption during (1) normal network operation and during (2) emergency operation in the event of a building power failure.

The management unit 164 (FIG. 2A) comprises software that may execute on any PC or server connected to the network. The management unit functions to communicate telemetry and control information to the power over LAN components, e.g., power/data combiners and splitters, distributed throughout the network. The data communications network itself transports the data messages between the power over LAN enabled devices and the management unit. The management unit provides monitoring and provisioning functions. The provisioning function allocates the available power resources, in an analogous manner to network data traffic being managed, and serves to configure the power path across the network from source to sink.

A network administrator is able to determine the systems method for handling those network ports that indicate no-load, overload or current leakage to earth ground. The power to a faulty port can be shut down or limited to a desired value. Recovery from a shut down state can be automatic based on port condition or can be done manually. Each port can be configured individually in accordance with system setup configuration.

Note that each power/data combiner can be constructed to be managed independently or via external control. Each power/data combiner may comprise a dedicated LAN data connection or it may comprise serial/parallel communications to a network host system that, in turn, transfers telemetry and control data to the network LAN.

Reduced Power Operation

In the event of a building power failure, certain network devices and nodes, e.g., hubs, routers, bridges, switches, etc., may need to be bypassed in order to maintain data and power continuity between critical network nodes, terminals and devices. The electrical power that is supplied by a single large LAN channel should, in most cases, be sufficient to operate the majority of network devices. This LAN channel, however, probably would not be sufficient to simultaneously operate a normal network hub/switch and all of its connected network devices. In addition, LAN devices are typically useless unless they receive both power and data communications at the same time. The power over LAN system of the present invention functions to maintain the flow of electrical power and data communications in the event of a failure. The LAN node units, i.e., hubs, switches, etc., and network devices switch to a reduced power operating mode during building power failures. When a device is in a reduced power operating mode, it will either reduce its data handling bandwidth and/or processing activities and keep only a few ports active and shut down its remaining ports in order to reduce its overall power consumption. Thus, a battery based UPS can be used to support a plurality of critical network elements for extended periods of time.

While the invention has been described with respect to a limited number of embodiments, it will be appreciated that many variations, modifications and other applications of the invention may be made.

What is claimed is:

1. A power data combiner comprising:
  a line interface circuitry configured to receive a plurality of data communications signals and an electrical power signal, said line interface circuitry further configured to output a plurality of combined power/data signals substantially without interfering with data communications; and
  a current limiting and sense circuitry connected to the line interface circuitry and configured to:
  limit one of current and power delivered by said line interface circuitry into each of said plurality of combined power/data signals to a maximum level; and
  provide a minimum current threshold reference level for each of said plurality of combined power/data signals.

2. A power data combiner according to claim 1, wherein said power data combiner is integrated into one of a LAN hub and a LAN switch, said one of a LAN hub and a LAN switch supplying said data communications signals.

3. A power data combiner according to claim 1, wherein said power data combiner is external of a LAN switch supplying said data communications signals.

4. A power data combiner according to claim 1, wherein said power data combiner is external of a LAN hub supplying said data communications signals.

5. A power data combiner according to claim 1, wherein said current limiting and sense circuitry is further configured to provide one of unbalanced detection and current leakage detection for each of said plurality of combined power/data signals.

6. A power data combiner according to claim 1, wherein said current limiting and sense circuitry is further configured to disconnect power from any of said plurality of combined power/data signals in the event said minimum current threshold level for said combined power/data signal is not met.

7. A power data combiner according to claim 1, wherein said maximum level is independently senable for each of said plurality of combined power/data signals.

8. A power data combiner comprising:
  a line interface circuitry configured to receive at least one data communications signal and at least one electrical power signal, said line interface circuitry further configured to output for each of said received at least one data communication signal and electrical power signal a combined power/data signal substantially without interfering with data communications; and
  a filter and protection circuitry connected to the line interface circuitry and configured to:
  output said at least one electrical power signal;
  limit the power available for each of said combined power/data signals to a predetermined level;
  sense current for each of said combined power/data signals, and
  provide a minimum and a maximum current threshold reference level for the power of each of said combined power/data signals.

9. A power data combiner according to claim 8, wherein said power data combiner is integrated into one of a LAN hub and a LAN switch, said one of a LAN hub and a LAN switch supplying said data communications signals.

10. A power data combiner according to claim 8, wherein said power data combiner is external of a LAN switch supplying said data communications signals.

11. A power data combiner according to claim 8, wherein said power data combiner is external of a LAN hub supplying said data communications signals.

12. A power data combiner according to claim 8, wherein said filter and protection circuitry is further configured to provide one of unbalanced detection and current leakage detection for each of said combined power/data signals.

13. A power data combiner according to claim 8, wherein said filter and protection circuitry is further configured to disconnect power from any of said combined power/data signals in the event the current component of said power is outside said threshold reference levels.

14. A power data combiner according to claim 8, wherein said maximum current threshold reference level is independently settable for each of said combined power/data signals.

15. A power injector for use with pairs of conductors of local area network communication cabling, the power injector comprising:
- a means for receiving a low frequency power signal;
- a current limiting circuitry connected to said means for receiving; and
- a plurality of means for injecting power received from said means for receiving to a respective at least one pair of conductors of the local area network communication cabling;
- said current limiting circuitry configured to:
  - limit one of current and power injected by each of said plurality of means for injecting power to a predetermined level; and
  - provide a minimum current threshold reference level for each of said plurality of means for injecting power.

16. A power injector according to claim 15, wherein said current limiting circuitry is further configured to provide one of unbalanced detection and current leakage detection for each of said plurality of means for injecting power.

17. A power injector according to claim 15, wherein said current limiting circuitry is further configured to disconnect power from any of said plurality of means for injecting power in the event said minimum current threshold reference level for said means for injecting power is not met.

18. A power injector according to claim 15, wherein said predetermined level is independently settable for each of said plurality of means for injecting power.

19. A method of delivering power for a plurality of nodes over a data communication cabling, the method comprising:
- receiving a plurality of data signals;
- receiving a low frequency power signal;
- combining said received plurality of data signals and said received low frequency power signal into a plurality of combined power/data signals, said low frequency power signal substantially not interfering with said data signals, said plurality of combined power/data signals being transmittable over the data communication cabling to a plurality of nodes;
- limiting one of current and power to a limit level for each of said plurality of combined power/data signals; and
- providing a minimum current threshold reference level for each of said plurality of combined power/data signals.

20. A method of delivering power for a plurality of nodes over a data communication cabling, the method comprising:
- receiving a plurality of data signals;
- receiving a low frequency power signal;
- injecting said received low frequency power signal into a plurality of pairs of conductors of the data communication cabling not implemented for data communications;
- limiting one of power and current to a limit level for each of said plurality of pairs of conductors not implemented for data communications and
- providing a minimum current threshold reference level for each of said plurality of pairs of conductors not implemented for data communications receiving said injected low frequency power signal.

* * * * *

UNITED STATES PATENT AND TRADEMARK OFFICE
CERTIFICATE OF CORRECTION

PATENT NO. : 7,325,150 B2  Page 1 of 1
APPLICATION NO. : 11/092589
DATED : January 29, 2008
INVENTOR(S) : Amir Lehr and Ilan Atias It is certified that error appears in the above-identified patent and that said Letters Patent is hereby corrected as shown below:

Claim 7 - line 2 - should read --said maximum level is independently "settable" for each of--

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO.       : 7,325,150 B2
APPLICATION NO.  : 11/092589
DATED            : January 29, 2008
INVENTOR(S)      : Amir Lehr and Ilan Atias It is certified that error appears in the above-identified patent and that said Letters Patent is hereby corrected as shown below:

Column 14, Claim 7, line 34 - should read --said maximum level is independently "settable" for each of--

This certificate supersedes the Certificate of Correction issued May 20, 2008.

Signed and Sealed this

Seventeenth Day of June, 2008

JON W. DUDAS
*Director of the United States Patent and Trademark Office*